United States Patent Office 2,724,656
Patented Nov. 22, 1955

2,724,656

LIME-BRICK AND METHOD FOR ITS PRODUCTION

Rudolf Gunzelmann, Bremen, Hermann Erythropel, Essen-Bredeney, and Georg Krüger, Lunen, Germany, assignors to Atlas-Werke A. G., Bremen, Germany, and Steinkohlen Elektrizitat Aktiengesellschaft, Essen, Germany, German firms No Drawing. Application June 21, 1952, Serial No. 294,926

3 Claims. (Cl. 106—120)

It has already been proposed to use ashes from combustion of pit coal or brown coal or byproducts from ore dressing as ingredients for lime brick production. The use of fly ash from powdered coal combustion as the chief ingredient hitherto was not possible without great difficulties especially arising from the formation of layers when forming the mass in the stone press. These layers adversely affected the strength of the lime brick before and after the indurating stage of its production and often cause cracking off or exfoliation of stone pieces. This effect may result from the high degree of fineness of the fly ash in consequence of which the residual air entrapped and mixed with the mass in the press cannot escape and will form air films within the brick. It is possible to avoid this disadvantage by special processes during pressing the mass, however, such additional processes are complicated and expensive. Furthermore lime bricks made from fly ash alone of normal composition are not sufficiently frost resistant.

In accordance with the present invention, besides fly ash from powdered coal combustion a granulate of melting chamber ashes or combustion chamber ashes are used as an ingredient for the production of lime bricks. Because of the special grain character of the granulate the air can escape more easily during the forming process in the pressing machine and the formation of air films and layers is avoided. Lime bricks produced from such a mixture of fly ash and granulate of melted ash from the melting chamber or combustion chamber of powdered coal combustion have very good qualities as far as structure and strength are concerned. In this way the applicability of fly ash for the production of lime bricks has been advanced considerably.

Samples have been made up with fly ash from a pulverized coal furnace. The composition of the ash was as follows: 40% $SiO_2$, 26% $Al_2O_3$, 6% Fe, 15% combustible ingredients.

Almost equal quantities of this material and a granulate of melted ashes from the same furnace as the fly ash were mixed together. In this formula 45% of said fly ash, 45% of said granulate and 10% calcium lime with sufficient water were mixed together and the mixture was compressed in a pressing machine and then the moulded parts after being removed from the pressing machine were indurated in an autoclave with steam of about 200 pounds pressure per square inch for 3 hours. When a high pressure was exerted, the strength of the pressed and hardened brick was about 100 kg./cm.² with a specific gravity of about 1.1 kg./litre.

Preferably lime bricks with a plurality of holes are produced as such holes facilitate the escape of enclosed air during the compressing process. The compressing may be done in several steps in order to give the air a chance to escape between the compressing steps.

It will be recognized that the sample specifically described herein can still be the subject of considerable modification without departing from the spirit and scope of our invention. Especially other quantities of granulate may be used. However, preferably a quantity of more than 20% is used for the production of lime bricks according to the present invention.

The melted ashes from the melting chamber of the furnace can be granulated in the customary way to grains with a diameter of about 10 mm. or less, e. g. to grains with an average thickness of 5 to 6 mm. The lime brick according to our invention is sufficiently frostproof which may principally result from the presence of larger pores which do not fill with water by capillary action to such a high degree as fine capillaries would. Besides this the percentage of combustible ingredients is diminished by the addition of granulates which usually contains only small quantities of such ingredients.

What we claim is:

1. A lime brick, cured under moist heat, comprising a compact mixture, of an amount of fly-ash from powdered coal combustion equal to between 45% and about 70% by weight of the total weight of the dry ingredients, an amount of granulated melting chamber ashes equal to between 45% and about 20% by weight of the total weight of the dry ingredients and about 10% lime, the necessary amount of water included.

2. A lime brick cured under moist heat comprising a compact mixture of an amount of fly ash from powdered coal combustion of approximately 45% by weight and an amount of a granulate of melted ashes of 45% by weight and 10% calcium lime mixed initially with sufficient water, the ingredients being mixed and molded in a pressing machine in an autoclave with steam of about 200 pounds per square inch pressure for approximately three hours.

3. A lime brick cured under moist heat comprising a compact mixture of an amount of granulated melting chamber ashes greater than 20% by weight of the total mixture and fly ash from powdered coal combustion between 45% and 70% by weight of the total weight of dry ingredients and 10% calcium lime with sufficient water for forming a uniform mixture, said ingredients being compressed together by a compressing machine in an autoclave with steam at about 200 pounds per square inch pressure for three hours, whereby hardened brick of substantial strength is formed.

References Cited in the file of this patent

UNITED STATES PATENTS

| | | |
|---|---|---|
| 744,432 | Sutcliffe | Nov. 17, 1903 |
| 1,440,234 | North | Dec. 26, 1922 |
| 1,552,051 | Crume | Sept. 1, 1925 |
| 2,250,107 | Nelles | July 22, 1941 |
| 2,564,690 | Havelin et al. | Aug. 21, 1951 |

FOREIGN PATENTS

| | | |
|---|---|---|
| 2,605 | Great Britain | of 1907 |

OTHER REFERENCES

Hughes, H. H., "Scope of the Lightweight Aggregate Industry," The American Institute of Mining and Metallurgical Engineers, Technical Publication No. 405 (1931), page 7.